May 8, 1923.

A. E. GRIFFITH

ROLLER BEARING

Filed Aug. 30, 1920

1,454,785

Witness:
George W. Giovanetti

Inventor
A. E. Griffith
By H. B. Wilson & Co.
Attorneys

Patented May 8, 1923.

1,454,785

UNITED STATES PATENT OFFICE.

ABNER EUGENE GRIFFITH, OF DULUTH, MINNESOTA.

ROLLER BEARING.

Application filed August 30, 1920. Serial No. 406,790.

*To all whom it may concern:*

Be it known that I, ABNER E. GRIFFITH, a citizen of the United States, residing at Duluth, in the county of St. Louis and State of Minnesota, have invented certain new and useful Improvements in Roller Bearings; and I do declare the following to be a full, clear, and exact description of the invention, such as will enable others skilled in the art to which it appertains to make and use the same.

This invention relates to an improved roller bearing of the type used in connection with the hub of a wheel and one object of the invention is to provide a bearing having improved means for rotatably mounting the anti-friction rollers and spacing rollers and to so construct the disks which mount these rollers that a race may be provided which will cooperate with races at the ends of the sleeve mounted in the hub of the wheel for carrying anti-friction bearing balls.

Another object of the invention is to so construct the disks that the rollers and anti-friction bearing balls may move freely, thus permitting the wheel to turn very easily.

Another object of the invention is to so construct the disks that the rollers may be permitted to turn freely but held against movement out of proper engagement with the disks.

Another object of the invention is to provide a bearing which is so constructed that it may be very easily taken apart for cleaning and put together again.

This invention is illustrated in the accompanying drawing wherein.

Figure 1:
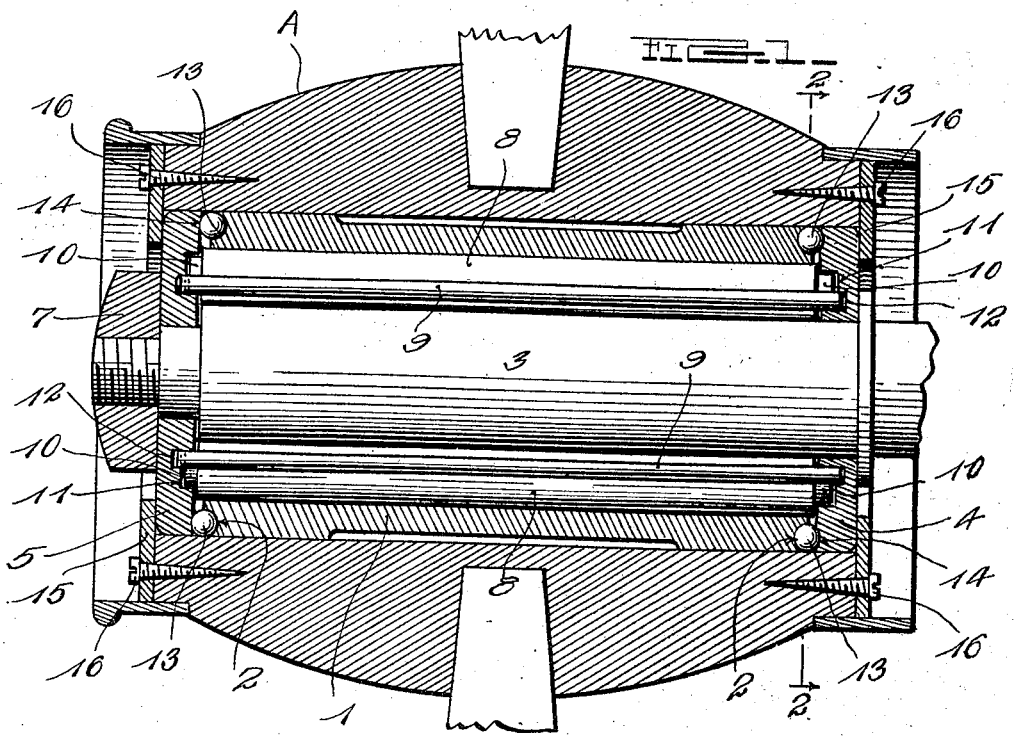
Figure 1 is a longitudinal sectional view through the roller bearing and the hub of a wheel.
Figure 2:
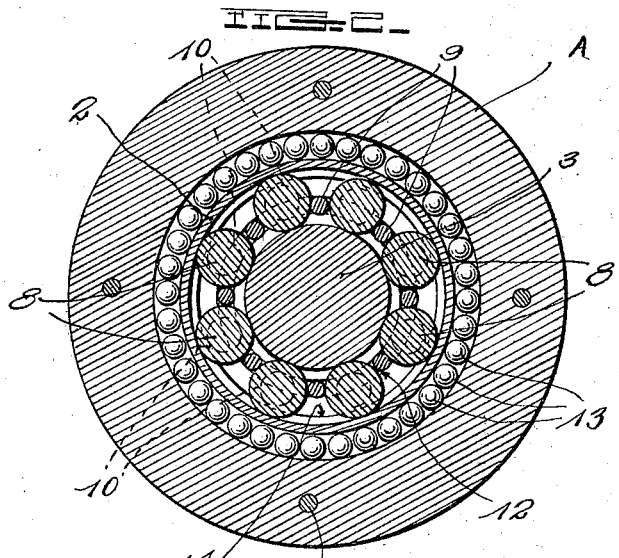
Fig. 2 is a transverse sectional view taken along the line 2—2 of Fig. 1.

This roller bearing is provided with a sleeve 1 which fits into the hub A of a wheel and is provided at its ends with bearing races 2 located at the ends of the hub when the sleeve is in place. This sleeve will fit upon the spindle 3 between the disks 4 and 5, the disk 4 being located at the inner end of the spindle and the disk 5 fitting upon the reduced and threaded outer end portion 6 of the spindle and engaged by a securing nut 7 which is screwed upon the reduced end portion. The anti-friction rollers 8 and spacing rollers 9 are put in place about the spindle and within the sleeve and have their end portions extending beyond the ends of the sleeve so that the reduced end portions 10 of the rollers 8 fit into the grooves or annular seats 11 of the disks and the end portions of the spacing rollers 9 fit into the deepened or countersunk portions 12 of the grooves 11. It will thus be seen that the rollers will be engaged by the two disks and held against longitudinal movement but at the same time permitted to rotate freely as the wheel rotates. In order to hold the wheel hub against longitudinal sliding movement and assist in preventing friction, there has been provided bearing balls 13 which fit into the races 2 at the ends of the sleeve and the outer grooves or races 14 formed adjacent the peripheries of the disks. It will thus be seen that when this bearing is assembled, the wheel will be mounted for very free rotation and that the bearing balls and anti-friction and spacing rollers will be supported and held in place by disks which are very simple in construction and cheap to produce.

It will be further noted that when it is desired to take the bearing apart for cleaning it is simply necessary to remove the securing nut 7 and then, after removing the disk 5, draw the wheel and sleeve off of the spindle. The wheel can then be put back in place and the anti-friction rollers and spacing rollers inserted. The bearing balls will be put in place between the disk 4 and the inner end of the sleeve and the disk 5 and securing nut put back in place. In order to retain the bearing in the hub and prevent it from coming apart when the wheel is removed from the spindle there have been provided disks 15 which are secured to the hub by screws 16 and extend to engage the disks 4 and 5. Therefore the nut 7 can be removed and the wheel drawn from the spindle without the bearing falling apart.

What is claimed is:

1. A device of the character described comprising a wheel hub, a sleeve fitting tightly within said hub and terminating short of the ends of the hub, disks positioned within said hub between the ends of the sleeve and the ends of the hub and having their central portions cut out and their inner faces provided with circular bearing grooves having their inner peripheral portions countersunk, anti-friction balls between said disks and the ends of said sleeve, main bearing rollers positioned in said sleeve and having their end portions fitting into the grooves in the inner faces of said disks, spacing rollers between said main rollers having their end portions fitting into the countersunk portions of said grooves, retaining disks secured upon the ends of said hub and extending in overlapping relation to the outer faces of the bearing disks, the retaining disks having their central portions cut out to a greater extent than the bearing disks whereby a spindle having a threaded outer end portion and a collar at its inner end may be passed through the bearing disks with the collar engaging one of the bearing disks and the main rollers engaging the spindle and a securing nut upon the threaded end portion of the spindle engaging the second bearing disk.

2. A structure of the character described comprising a sleeve for fitting tightly within a wheel hub and about a spindle, disks for fitting in the wheel hub in spaced relation to the ends of said sleeve, anti-friction balls fitting between said disks and the ends of said sleeve, retainer rings adapted to be secured to the ends of a wheel hub and overlap said disks to retain the disks in an operative position, said disks having their inner faces provided with circumferentially extending grooves, and anti-friction rollers within said sleeve having their end portions fitting in the grooves of said disks.

In testimony whereof I have hereunto set my hand.

ABNER EUGENE GRIFFITH.